United States Patent [19]
Mletzko

[11] Patent Number: 5,113,042
[45] Date of Patent: May 12, 1992

[54] DIGITIZER TABLET WITH REDUCED RADIATION SUSCEPTIBILITY

[75] Inventor: Alfred E. Mletzko, Woodbury, Conn.

[73] Assignee: Summagraphics Corporation, Seymour, Conn.

[21] Appl. No.: 615,981

[22] Filed: Nov. 20, 1990

[51] Int. Cl.[5] .............................................. G08C 21/00
[52] U.S. Cl. ....................................................... 178/19
[58] Field of Search ....................................... 178/18, 19

[56] References Cited

U.S. PATENT DOCUMENTS

| | | |
|---|---|---|
| 3,873,770 | 3/1975 | Ioannou . |
| 3,904,822 | 9/1975 | Kamm et al. . |
| 4,368,351 | 1/1983 | Zimmer . |
| 4,794,208 | 12/1988 | Watson ................................ 178/19 |
| 4,859,814 | 8/1989 | Sciacero et al. ..................... 178/19 |
| 4,896,002 | 1/1990 | Papsin . |

OTHER PUBLICATIONS

Graphic Details, Stanford Diehl and Steve Apiki, Jan. 1989, Byte Magazine, pp. 162–174.

Primary Examiner—Stafford D. Schreyer
Attorney, Agent, or Firm—Rosen, Dainow & Jacobs

[57] ABSTRACT

A digitizer tablet capable of reduced coordinate wobble due to beat interference between an induced display scan rate and the tablet scan rate by introducing a controlled delay to change the time between successive samples to increase the beat frequency to the point where it can be effectively filtered out.

16 Claims, 3 Drawing Sheets

DIGITIZER TABLET WITH REDUCED RADIATION SUSCEPTIBILITY

This invention relates to digitizer tablets, and in particular to digitizer tablets exhibiting reduced susceptibility to external radiation.

BACKGROUND OF INVENTION

Digitizer tablets are well known in the art. In one popular type, the pointing device comprises a coil in a cursor or stylus configuration which is positioned by a user over a tablet surface in which is embedded a conductive wire grid extending in two coordinate directions. In one mode, the pointing device coil is energized to electromagnetically induce signals in the grid wires. In another mode, the grid wires are energized to electromagnetically induce signals in the pointing device coil. In both modes, the grid wires are sequentially addressed, either one at a time or in groups, to provide an output analog voltage in timed relation to the grid addressing. The output voltage with increasing time reaches a maximum, passes through zero, and then reaches a minimum. When addressing begins, a counter is activated which keeps track of the particular grid line addressed. A stop signal for the counter is generated when the zero crossover is determined. The count value determines the location of the pointing device with respect to the two or three closest grid wires. Examples of patents describing in more detail this type of digitizer are Kamm et al. U.S. Pat. Nos. 3,904,822; Ioanau 3,873,770; and Zimmer 4,368,351, whose contents are hereby incorporated by reference. BYTE, January 1989, pages 162–174, gives a general description of such devices and their performance.

Because of the speed of the signal processing, it is possible to scan the grid conductors a number of times before the user has changed the position of the pointing device. This allows the coordinate pair outputted to be the average of a number of scans. This eliminates aberrant signals and improves accuracy. By "scan" is meant, as will be clear from the foregoing description, applying to the grid conductors, usually sequentially, a high-frequency energizing signal 10 (commonly 10 KHz to 100 KHz), and processing the signals induced in the pointing device, or applying the high-frequency energizing signal to the pointing device, and scanning the grid conductors (usually sequentially) to collect the induced signals for subsequent processing. A typical scan rate is 100–200 Hz. This means that 100–200 times per second, the grid/pointing device are activated, induced signals collected and processed to determine a coordinate position. Averaging of points determined is typically used to protect against inevitable erratic readings. Due to the relatively low scan rate, and to avoid reducing the device response time (typically up to 150 outputted or reported coordinate pairs per second), heavy averaging type filters are typically not used but instead running average type filters. With the latter, each new determined point is averaged with a previous average and a new output reported each time, which maintains a constant report rate. Various degrees of filtering are obtained by variable weighting in the averaging process of the previous average and the new point. It is known to heavily weight the previous average compared with the new point (as high as 100:1) to reduce noise and jitter, usually random fast changes in reported coordinates, represented on the display by fast erratic cursor movement.

A problem has been observed during the operation of such tablets. It has been observed that, from time to time, though the pointing device is held in one position on the tablet's working surface, the cursor displayed on the display device connected to the computer that is converting the pointing device position, wanders, i.e., its position is not fixed as it should be but exhibits a slow cyclic movement, herein referred to as "wobble".

SUMMARY OF INVENTION

The principal object of the invention is a digitizer tablet in which display cursor wandering or wobble is reduced or eliminated.

The invention is based on the recognition that the display cursor wobble problem is a result of spurious signals induced in the tablet grid conductors or the cursor from external electromagnetic fields, herein sometime referred to as radiation interference. More particularly, I have discovered that the cause of the display cursor wobble is the presence in the vicinity of the tablet of a source of interfering radiation. In a typical work station environment in which the user operates the tablet while observing the display on a monitor connected to a computer console, I we have found that the problem arises as a result of an undesired relationship between the tablet scan frequency and the monitor display frequency signal picked up by the tablet. Specifically, if the difference in the two frequencies is relatively small, a slow beating of the two frequency signals occurs, with the result of adding to the desired signal an amplitude modulation that is not filtered out during the subsequent signal processing. This amplitude modulation is translated by the tablet circuitry into a position modulation or variation with time which causes the wobble.

A feature of the invention is to remove or lessen the wobble by varying the scan frequency by introducing a controlled delay to substantially eliminate the beating frequency, or preferably to drive the beat to a higher frequency which can be filtered out more effectively with the subsequent signal processing. This allows the use of wider bandwidth filters which affords greater fidelity of screen cursor movement relative to user hand movement on the tablet surface.

In accordance with a further feature of the invention, this is achieved through hardware, firmware, or software.

In the hardware solution, a switch or variable resistance or capacitance can be added, controlled by the user, to the clock circuit, which determines the scan rate, to slightly modify the tablet scan rate to reduce or eliminate the wobble when observed. This approach would slightly increase or slightly decrease the clock frequency, thus resulting in an increase or decrease of the scan rate.

In the firmware solution, the wobble is automatically sensed and delay introduced to modify the scan rate for fastest beat or most effective filtering.

In the software solution, delay to produce the modified scan rate can be obtained through a remote command from a utility program resident in the host computer.

It is noted that U.S. Pat. No. 4,794,208 which addresses a similar problem used a different approach. The latter involves determining the scan rate by means of a counter which when over-flowing generates a pulse which triggers the next scan cycle. In the event "flutter" obtains, the counter is not reset to zero, but to some higher initial value. The effect is to increase the scan frequency in relatively large steps, for example, 6 percent or more at a time. This means that the tablet circuitry including the usual hardware filters must be able to function properly over a relatively broad range of scan rates (the examples given cover the range of 57.6–102.4 KHz). In contrast, in the preferred embodiment of the present invention, the introduced delay in the scan algorithm reduces the scan frequency only a small amount for the purpose, preferably, of increasing the beat frequency of the interfering radiation to a point where it can be more effectively filtered out. The scan rate change is less than 2 percent, and usually even less than 1 percent. This very narrow range of scan rates requires no change in the hardware circuitry. More important, it allows the use of firmware filters which work on much lower frequencies without filtering out slow hand movements by the user. This approach of the invention, which is to enhance effectiveness of the solution, rather than merely to attempt to avoid the problem, is the least expensive way of overcoming the wobble problem.

Further details on how to implement the various solutions, as well as other objects and advantages of the invention, will be evident from the detailed description that follows of several preferred embodiments taken in conjunction with the accompanying drawings.

DETAILED DESCRIPTION OF PREFERRED EMBODIMENTS

Figure 1:
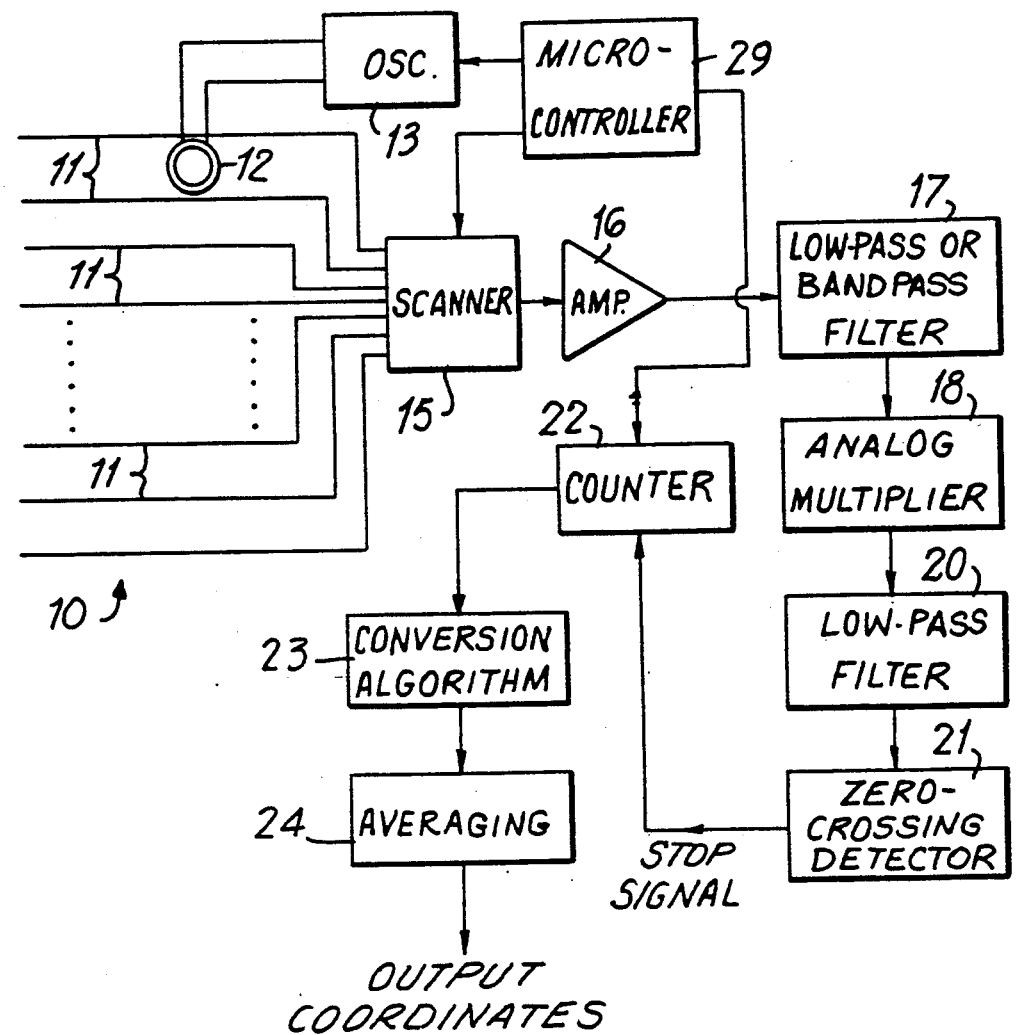
FIG. 1 is a block diagram of a typical digitizer tablet to illustrate how the problem solved by the invention arises.

FIG. 1 illustrates, in a block diagram, a system in accordance with the invention. The tablet 10 is indicated by an electrode array of parallel conductors 11, useful for indicating the position of a pointing device 12 represented by a coil in one coordinate direction, say the Y direction. As is conventional, a second array of conductors, orthogonal to the first, would be provided to furnish information about the pointing device position in the X direction. This has not been shown because the operation is identical, and it will be understood that the invention is not limited to determining only one coordinate but encompasses also two or more coordinates as is conventional. In the example illustrated, the pointing device is excited by an AC source 13—10-100 KHz is common—causing voltages to be induced in the array conductors 11. Each of the array conductors are sequentially addressed by a known scanner 15—essentially a multiplexer—which connects to each conductor in turn. The addressing order is not important to the invention.

Each time that the scanner 15 connects to an array conductor 11, the induced signal voltage is detected and amplified in an amplifier 16.

It will be appreciated that the array conductors extend over a sizable area corresponding to the working surface area of the tablet. Hence, they are subject to extraneous radiation fields and pickup voltages unrelated to the AC signal from the pointing device 12. These signals, desired and undesired, are typically filtered through a low pass or bandpass filter 17 which passes the frequency of the oscillator 13. This eliminates some but not all of the noise. Following the filter 17 is an analog multiplier 18 which acts as an AM demodulator to recover the envelope impressed on the oscillating carrier, due to the different magnitudes of the induced voltages in each of the array conductors, which as is known depends upon the location of each conductor relative to the pointing device 12. The resultant signal, which essentially is at the scan rate of the array conductors by the scanner 15, is conventionally low-pass filtered 20 again to remove extraneous noise, producing the characteristic waveform of increasing magnitude peaking in the vicinity of the pointing device, then reversing phase, and crossing the zero-level or other reference level at the exact pointing device position. This zero crossing is detected by a zero-crossing detector 21, and as is conventional generates a stop signal. The latter then stops a counter 22 which was initiated when the scanner started. The counter value represent the pointing device position. The count is then algorithmically converted 23 to a digital value which is stored, averaged 24 with previous digital values from previous scans, and the average digital value then converted into a coordinate which is outputted from the tablet 10 to a host computer 25.

Figure 2:
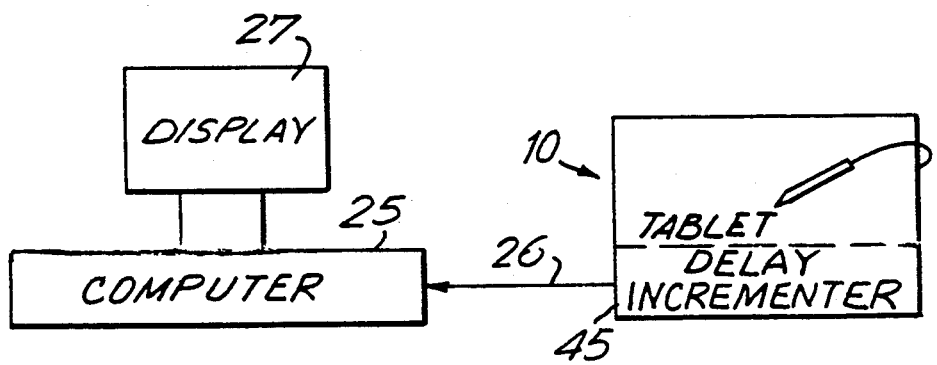
FIG. 2 is a block diagram showing a typical workstation setup employing a tablet in accordance with the invention.

FIG. 2 shows the tablet 10 connected by way of an output cable 26 to the computer console. The computer software then converts the outputted coordinate to a display cursor position on the screen of a display or monitor 27.

I have observed that the monitor cursor display is not always stable. In other words, the cursor shifts position even though the pointing device is in a fixed position, what I have called herein "wobble". This is easily demonstrated by using the software described in commonly-assigned U.S. Pat. No. 4,896,002 (SCG-313), which displays on the display screen the pointing device coordinates outputted by the tablet. When wobble is present, the values slowly change over a small range. If a cursor were displayed, the cursor position would vary or wobble even though the pointing device is fixed in position.

I have determined that the problem is connected with the closeness of the display to the tablet, since, in a typical workstation, both pieces of hardware are very close to one another. The conventional display or monitor employs a CRT in a conventional raster scan which repeats, typically, at 10 KHz to 70 KHz per second, which is created by electronic circuitry. I believe that this signal is radiated from the display monitor, and that radiation is picked up by the tablet conductors or the pointing device coil, resulting in a summing of the radiation and the desired signal being processed within the tablet. The effect on the desired demodulated waveform, whose detected crossover point generates the stop signal, causes the typically higher frequency interfering waveform to ride on top of the demodulated waveform at the scanning frequency. When the phase of the interfering radiation is very close to the scan crossover point value, the slow beat previously described occurs which causes the small variation in the detected crossover producing the wobble. This cannot be filtered out by the usual hardware filters incorporated in the tablet, because it is not dissimilar to the kind of signal change that normally occurs when the user slowly moves the pointing device over the tablet working surface and which the tablet should report.

One possible solution to avoid this problem is to adjust the frequency of the tablet scan rate to get away from the display frequency, as is described in U.S. Pat. No. 4,794,208. However, for certain tablets which rely on filters in its analog path to generate the correct output and reduce noise somewhat, this is not entirely satisfactory. For such tablets, changing frequency would change phase due to filters and affect the final envelope in adverse ways.

A preferred solution in accordance with the invention is to adjust or modify the scan repetition frequency by introducing a controlled delay to increase the rate of wobble sufficiently to allow use of a minimum amount of firmware low pass filtering, and/or increase the effectiveness of the filter in use which may be determined by other constraints of fidelity required. One way to do this in firmware is by adding a determined delay to the firmware loop. This is illustrated in FIG. 3.

In a typical tablet, a microcontroller 29 (FIG. 1) controls the scanning of the array conductors. The scanner 15 is first commanded 30 to scan the conductors for the X coordinate, next it is commanded 31 to scan for the Y coordinate. The resultant signals are processed and filtered 32 and stored for averaging or transmitted (reported) 33 to the host. In accordance with the invention, a delay δ 35 is introduced into the loop so as to modify the scan rate.

Figure 4:
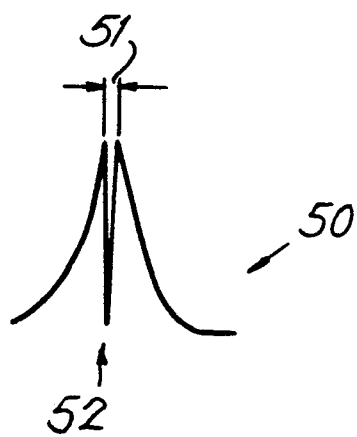

As previously explained, when the monitor frequency is such that an exact number of cycles are completed in one scan, the two frequencies are said to be in sync. A slight change in the frequency of either results in a slow procession of one with respect to the other. This produces a "slow" beating since one is signal and one is interference, adding an amplitude variation to the desired signal. The amplitude variation is then translated into a positional variation with a time period which equals the rate of procession of one against the other. FIG. 4 illustrates a waveform 50 representing wobble or frequency beat of the monitor (along the ordinate) and tablet scan rates as a function of scan rate (along the abscissa). The region indicated by 51 represents a slow wobble within the passband of the low-pass filter 20 with no signal amplitude reduction. The point indicated by numeral 52 represents the 0 beat or in sync position of the two scan rates or their harmonics.

Figure 3:
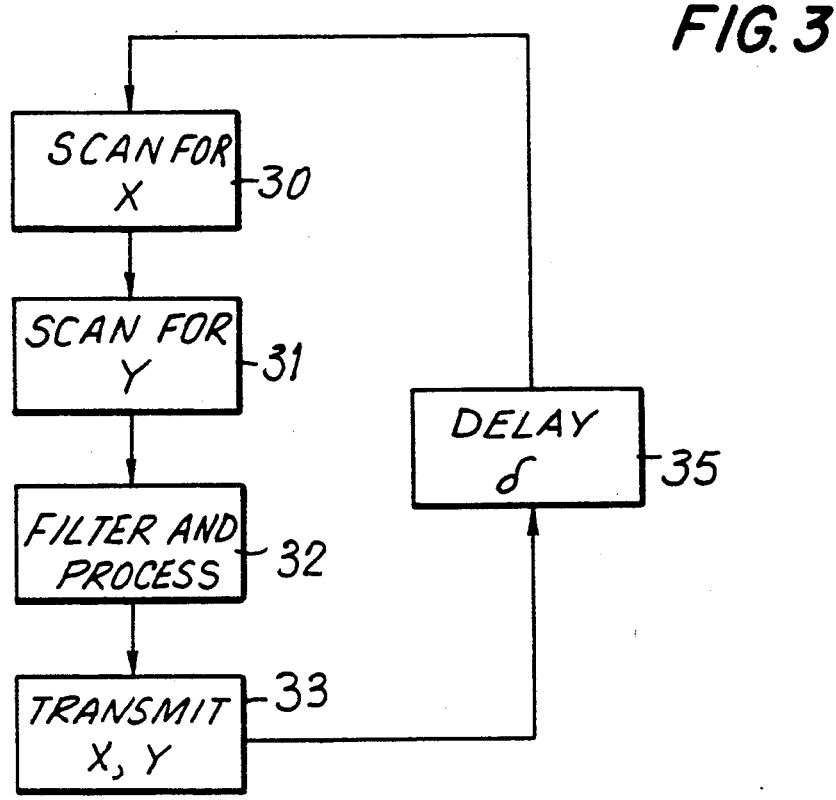
FIG. 3 is a flow diagram showing the basic concept underlying the invention.

The addition of the small delay to the firmware loop indicated in FIG. 3 reduces the scan frequency and drives the beat to a higher frequency. Since it is necessary only to add the equivalent of a fraction of one monitor frequency cycle, and these are normally in the 60 μs (at 15 KHZ) to 15 μs (at 70 KHz) range, I need only add 5 to 20 μs to a normal scan cycle time of 8-9 ms. This represents a change of only 20/8000 or 0.25% worst case for a typical tablet, or about ¼ of one of the 115 scans, reducing it to say 114.7 scans/sec. It is assumed in this discussion that the loop depicted in FIG. 3 takes approximately 8.69 ms (or 115 times/sec) and the monitor frequency is, say 30 KHz, and thus δ (the delay) need only be increased between 0 and 33 μs to cause the wobble to occur at the highest frequency. This will not eliminate wobble in all cases, but it will increase the beat frequency to the point that it is easier to filter out.

Figure 5:
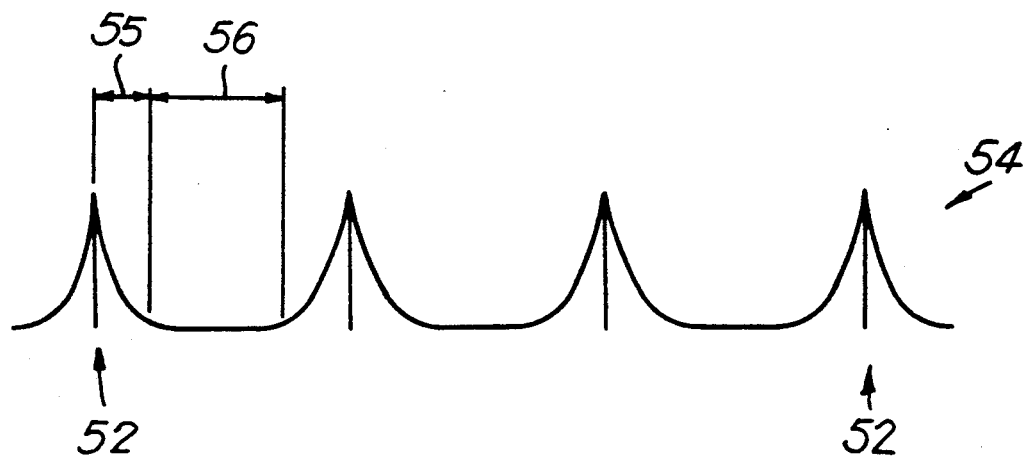
FIGS. 4 and 5 are waveforms indicating the wobble problem and several possible modes of operation to minimize wobble.
Figure 6:
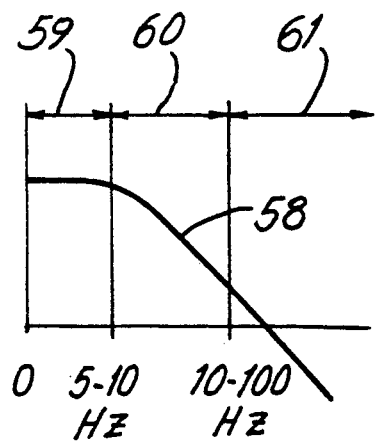
FIG. 6 is the filter characteristic of a typical low-pass filter used in such tablets.

The waveform 54 in FIG. 5 illustrates the above concepts. It is an expanded cyclical view of the waveform of FIG. 4, and represents the wobble one would observe after points were filtered by a conventional firmware filter. Other similar type low-pass filters would produce similar waveforms. The region indicated by numeral 55 represents beat frequency which results in partially effective wobble elimination as a result of low-pass firmware filtering. The region indicated by numeral 56 represents the increased beat frequency which results in fully effective wobble elimination using a conventional band of firmware filters. This is also illustrated in FIG. 6, which is the attenuation versus frequency characteristic 58 of a typical low pass filter used in conventional tablets. The region indicated by numeral 59 corresponds to region 51 in FIG. 4, showing that the low beat frequency lies fully in the pass band of the filter. Region 60 corresponds to region 55 in FIG. 5 showing that some attenuation of the wobble modulation imparted to the signal is accomplished by the low-pass filter. Region 61 corresponds to the region 56 in FIG. 5 when the beat frequency has been increased to the point that the filter is fully effective in attenuating its wobble effect.

As summarized above, there are three basic ways to implement this aspect of the invention, and other possibilities within the principles outlined herein will be evident to those skilled in this art. The three approaches would be (1) hardware: for example, a dip switch, potentiometer, or capacitor on the tablet that is hand adjustable or micro controlled; (2) firmware, where the controller adjusts for the fastest beat or most effective filtering, i.e., minimum noise; or (3) software, where the adjustment is made through a remote command from a utility program resident in the host. In this last case, the firmware is set up to make adjustments under command of the software.

The use of firmware is preferred, since it affords the least involvement of the user. It can be accomplished under command from a menu during which time the user does not move the pointing device. The user would select the anti-wobble function and place or leave the pointing device on the tablet surface until signalled, or for some predetermined time, say 1 second. The firmware would increment the delay while looking for minimum wobble, or no or minimum change of counts between coordinates, say eight or 10 in a row, using the software or an equivalent program to that described in U.S. Pat. No. 4,896,002. This should result in reaching the desirable region of operation indicated by 56 in FIG. 5. A possible weakness of this approach is that if the delay is incremented to the synchronous frequency (0 beat) and, since wobble then disappears, the program would think it is at the fastest wobble point when it's really at the slowest (0). This would be acceptable so long as no drift or change takes place between the tablet frequency and monitor frequency, which would probably require two crystal-controlled devices, producing a conditional stability that could last for fractions of an hour or more. However, it would still be a conditionally stable point. This corresponds to the point 52 indicated in FIGS. 4 and 5. The region 56 is the more desirable area of operation.

The software implementation has the advantage that no hardware is involved. The user would set the tablet into the minimum wobble point by sending repeat requests to increment the delay while watching the coordinates (filtered) on the monitor (using the test utility program). Once the proper delay for minimum wobble is determined, the user would send a command which would lock the set value in, and then go to (or go back to) the application. The value set would preferably place operation near the center of the region 56 of FIG. 5 giving good long term stability as small drifts would not carry it outside the area.

The hardware implementation is less desirable, since it requires additional hardware and accessibility by the user. This could be accomplished by having the controller "read" the settings of a row of dip switches, or an analog level via a potentiometer, for example, in the case of a tablet with an A/D port on its microcontroller. The potentiometer could be digital also in that it would set incremental analog levels.

Figure 7:
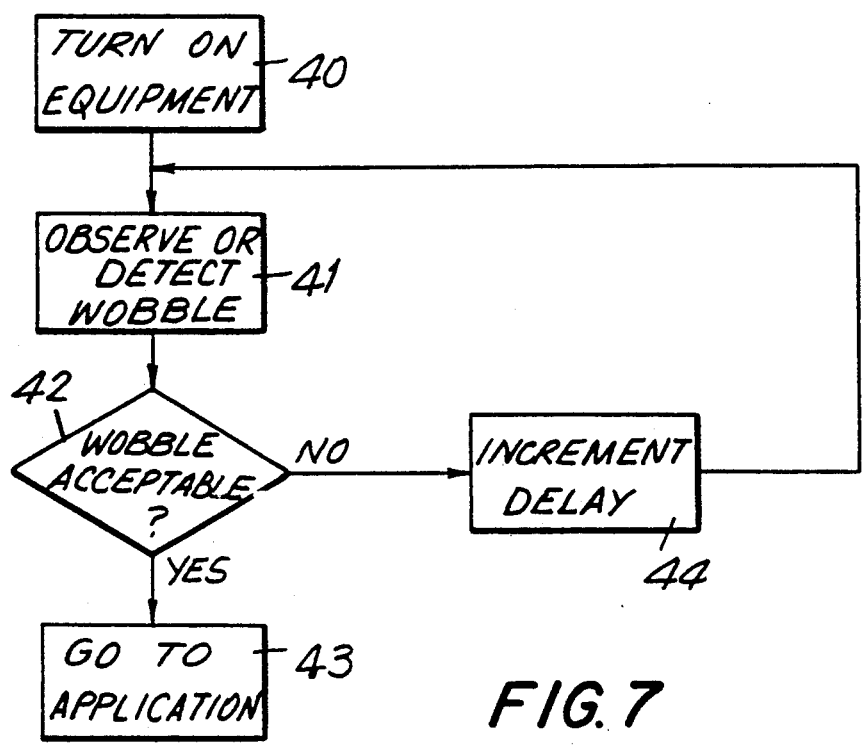
FIG. 7 is a flow diagram showing a preferred way to implement the invention.

Summarizing, the scan rate in the tablet, or sampling frequency as it sometimes is referred to, is adjusted by introducing a controlled delay to change the time between successive samples so that the phase relationship from one scan to the next varies significantly, preferably so as to cause the beat to become more rapid thereby making the filtering system—which should not remove slow user movements—more effective to attenuate the beat frequency. The range of change that will produce acceptable results is relatively small. At most a few percent—say, 2 percent or less—will raise the beat frequency to about 15 Hz or more. This frequency can more easily be filtered out by a conventional low-pass filter which typically works better on higher frequencies outside their cutoff than on low frequencies within their cutoff. No significant adverse effects on the tablet operation will occur by minimizing the frequency adjustment in this way. This is done by incrementing the value of the delay as illustrated in the flow diagram of FIG. 7 until a wobble detector indicates no or little wobble is present, or until the user through direct observation has found the minimum wobble position. In FIG. 7, at 40, the user turns on the equipment, with the tablet set for its normal or default scan rate. The user at 41 then observes the monitor for wobble. If none, or the amount is acceptable 42, he activates his application 43. If not acceptable, either manually or under program control or by way of a menu, the user increments the delay 44 by a fixed amount, say 5 $\mu s$ increment, until the observed wobble is acceptable.

FIG. 2 illustrates schematically at 45 the addition to the tablet of the delay incrementer in accordance with this preferred embodiment of the invention.

Though the invention is described in connection with the embodiment of FIG. 1, wherein a high-frequency signal is applied to the pointing device and the induced signals in the array conductors sequentially applied via the scanner 15 to the processing circuitry, it will be appreciated that it applies equally to the reverse mode of operation, namely, applying the high-frequency signal by way of the scanner sequentially to the array conductors, and deriving the induced signals of interest for processing from the pointing device.

While the invention has been described and illustrated in connection with preferred embodiments, many variations and modifications as will be evident to those skilled in this art may be made therein without departing from the spirit of the invention, and the invention as set forth in the appended claims is thus not to be limited to the precise details of construction set forth above as such variations and modifications are intended to be included within the scope of the appended claims.

What is claimed is:

1. A method of operating a digitizer tablet employing an electrode array adjacent a working surface and a pointing device wherein the electrode array is scanned at a given scan rate to obtain signals representative of the position of the pointing device over the working surface, said signals after processing including filtering being outputted for use by a controlled display to produce on the display objects representative of the pointing device position, said display objects exhibiting undesired wobble, the steps comprising:
   (a) introducing controlled delay to modify the tablet scan rate to reduce or eliminate the wobble.

2. The method of claim 1, wherein the tablet scan rate is varied over a range of about 2% or less while observing the degree of wobble.

3. The method of claim 1, wherein the tablet scan rate is decreased.

4. The method of claim 1, wherein the introduced delay is incremented in fixed steps until the degree of wobble is acceptable.

5. A digitizer tablet comprising:
   (a) an electrode array adjacent a working surface of the tablet,
   (b) a pointing device,
   (c) means for scanning the electrode array at a given scan rate which, when the pointing device is activated, produces desired signals representative of the position of the pointing device over the tablet working surface,
   (d) means including filtering means for processing said desired signals to convert same into coordinate values representative of the pointing device position with respect to at least one coordinate of a coordinate system associated with the tablet working surface,
   (e) means for outputting the said coordinate values to a display device for displaying objects representative of said coordinate values, said displayed objects exhibiting wobble,
   (f) means for introducing delay to modify the tablet scan rate in a direction to reduce or eliminate the wobble.

6. A digitizer tablet as claimed in claim 5, wherein the means of (f) includes means for incrementing the introduced delay.

7. A digitizer tablet as claimed in claim 6, wherein the incrementing means comprises hardware on the tablet.

8. A digitizer tablet as claimed in claim 7, wherein the hardware comprises switches or a variable resistance or capacitance in the scanning means to vary the scan rate.

9. A digitizer tablet as claimed in claim 5, wherein software is provided to vary the scan rate.

10. A digitizer tablet as claimed in claim 5, wherein a utility program is used to detect wobble, and means are provided to increase the scan rate to minimize wobble.

11. The digitizer tablet of claim 5, further comprising means for averaging the said desired signals.

12. The digitizer tablet of claim 11, wherein the averaging means comprises a running average filter.

13. The digitizer tablet of claim 5, wherein the filtering means of element (d) is a low-pass filter.

14. The digitizer tablet of claim 13, wherein the filter has a passband of about 0-15 Hz.

15. The digitizer tablet of claim 5, wherein the means for introducing delay is operable to vary the scan rate by 1 percent or less.

16. The digitizer tablet of claim 5, wherein the means for introducing delay is operable to vary the scan rate by 0.25 percent or less.

* * * * *